United States Patent
Larsson et al.

(10) Patent No.: US 9,563,666 B2
(45) Date of Patent: Feb. 7, 2017

(54) UNSUPERVISED DETECTION AND CATEGORIZATION OF WORD CLUSTERS IN TEXT DATA

(71) Applicant: Kairos Future Group AB, Stockholm (SE)

(72) Inventors: Tomas Larsson, Norrtälje (SE); Mats Lindgren, Uttran (SE)

(73) Assignee: Kairos Future Group AB, Stockholm (SE)

(*) Notice: Subject to any disclaimer, the term of this patent is extended or adjusted under 35 U.S.C. 154(b) by 378 days.

(21) Appl. No.: 14/358,438

(22) PCT Filed: Nov. 9, 2012

(86) PCT No.: PCT/EP2012/072290
§ 371 (c)(1),
(2) Date: May 15, 2014

(87) PCT Pub. No.: WO2013/072258
PCT Pub. Date: May 23, 2013

(65) Prior Publication Data
US 2014/0297659 A1    Oct. 2, 2014

(30) Foreign Application Priority Data

Nov. 15, 2011   (EP) ..................... 11189099

(51) Int. Cl.
*G06F 17/30* (2006.01)
*G06F 17/00* (2006.01)

(52) U.S. Cl.
CPC ..... *G06F 17/3053* (2013.01); *G06F 17/30011* (2013.01); *G06F 17/3071* (2013.01);
(Continued)

(58) Field of Classification Search
CPC ............ G06F 17/3053; G06F 17/30011; G06F 17/30312;G06F 17/30864; G06F 17/20; G06F 17/30241; G06F 17/30371; G06F 17/30424; G06F 17/30598; G06F 17/30616; G06F 17/30657; G06F 17/30696; G06F 17/30705; G06F 17/30707; G06F 17/3071; G06F 17/308
See application file for complete search history.

(56) References Cited

U.S. PATENT DOCUMENTS 6,078,913 A   6/2000  Aoki et al.
6,128,613 A   10/2000 Wong et al.
(Continued)

FOREIGN PATENT DOCUMENTS

EP   2 045 739 A2   4/2009
TW   201025123 A    7/2010

OTHER PUBLICATIONS

International Preliminary Report on Patentability, PCT Application No. PCT/EP2011/072290, Oct. 30, 2013.
(Continued)

*Primary Examiner* — Yicun Wu
(74) *Attorney, Agent, or Firm* — Myers Bigel, P.A.

(57) ABSTRACT

Categorizing data sets obtained from a number of sources includes determining the frequency of appearance of symbols in a first collection of data sets and the frequency of appearance of symbols in a second collection of data sets, determining the most significant symbols for the second collection based on the frequency of appearance in the first collection and the frequency of appearance in the second collection, grouping the most significant symbols into groups according to their appearance in the same data set and ranking the data sets in relation to the symbol groups according to a ranking scheme. Related methods, devices, and/or computer program products are described.

17 Claims, 3 Drawing Sheets

(52) U.S. Cl.
CPC .. *G06F 17/30687* (2013.01); *G06F 17/30705* (2013.01); *G06F 17/30707* (2013.01); *G06F 17/30713* (2013.01); *G06F 17/30722* (2013.01); *G06F 17/30731* (2013.01); *G06F 17/30734* (2013.01)

(56) References Cited

U.S. PATENT DOCUMENTS

| | | | |
|---|---|---|---|
| 6,778,995 | B1 | 8/2004 | Gallivan |
| 7,366,705 | B2 | 4/2008 | Zeng et al. |
| 7,376,618 | B1 | 5/2008 | Anderson et al. |
| 7,483,892 | B1 | 1/2009 | Sommer et al. |
| 7,809,718 | B2 | 10/2010 | Brinker et al. |
| 7,841,908 | B2 | 11/2010 | Shen et al. |
| 7,937,345 | B2 * | 5/2011 | Schmidtler .......... G06N 99/005 706/15 |
| 8,423,568 | B2 * | 4/2013 | Fuxman ............ G06F 17/30693 707/760 |
| 2003/0130993 | A1 | 7/2003 | Mendelevitch et al. |
| 2009/0094021 | A1 | 4/2009 | Marvit et al. |
| 2010/0205525 | A1 | 8/2010 | Konrad |

OTHER PUBLICATIONS

Taiwanese Search Report Corresponding to Taiwanese Patent Application No. 101141910; Date of Completion: Mar. 17, 2016; 1 Page.

* cited by examiner

UNSUPERVISED DETECTION AND CATEGORIZATION OF WORD CLUSTERS IN TEXT DATA

CROSS REFERENCE TO RELATED APPLICATION

This application is a 35 U.S.C. §371 national stage application of PCT International Application No. PCT/EP2012/072290, filed on Nov. 9, 2012, which claims priority to EP 11189099.2, filed Nov. 15, 2011, the disclosures and content of which are incorporated by reference herein in its entirety. The above-referenced PCT International Application was published in the English language as International Publication No. WO 2013/072258 A1 on May 23, 2013.

TECHNICAL FIELD OF THE INVENTION

The present invention relates to the categorizing of data sets. The invention more particularly relates to a method, device and computer program product for categorizing data sets obtained from a number of different sources.

DESCRIPTION OF RELATED ART

Data sets such as electronic documents, electronic articles, blogs and data in online discussion forums may exist on a variety of different computers. Such data sets are moreover often publicly provided. With the introduction of Internet it is then possible to access such data sets from virtually any computer. Hence, it is possible to obtain these data sets from a wide range of sources. There is thus a vast amount of information that is available on the Internet.

This abundance of information would be interesting to use in a number of different fields, such as in order to determine different social and consumer trends. However, the amount of information is so vast that it is hard to obtain any comprehensive and useful knowledge from it.

There is therefore an interest in organizing and categorizing data sets such that advanced information analysis can be performed on the data sets.

There exist a number of techniques for organizing, structuring and searching data sets.

Various methods of classifying data sets have for instance been proposed. As an example US 2010/0205525 describes automatic classification of a text based on the frequency of occurrence of a qualitative characteristic like a character shingle in the text. US 2009/0094021 describes determining a number of themes from a number of document clusters. U.S. Pat. No. 6,094,653 describes classification of words into word clusters.

There also exists various ways to group documents. EP 2045739 does for instance describe the selection of words in a document as keywords and clustering of the documents according to keywords to yield clusters, where each cluster corresponds to a topic. U.S. Pat. No. 6,078,913 describes clustering of selected documents to a hierarchical tree structure. U.S. Pat. No. 7,809,718 describes the finding of meta data of a document and the importance of words in the documents are emphasized if they also exist in the metadata. U.S. Pat. No. 6,778,995 describes extracting terms from a document and the building of a concept space over a document collection, identifying terms correlated between documents and populating clusters with documents having differences between document angles and cluster angles in a document space falling within a certain variance. U.S. Pat. No. 7,720,848 describes a probabilistic clustering system.

Furthermore, efforts have been made in the field of search optimization. U.S. Pat. No. 7,483,892 does for instance describe compiling a term-by-document matrix from documents representative of particular subject matter that represents the frequency of occurrence of each term per document and the creation of a weighted term dictionary. U.S. Pat. No. 5,926,812 describes grouping of word clusters and combining of similar word clusters for forming a single word cluster.

In a master thesis at the Lund University Sweden, Department of Industrial Management and Logistics, Production Management, "Textual Data Mining for Business Intelligence", 2010 Andreas Ek describes how information is obtained using hierarchical clustering, linear regression and probability based ranking.

However, there still exists a need for an improvement in this field.

SUMMARY OF THE INVENTION

The present invention is therefore directed towards providing an improved categorization of a collection of data sets.

One object of the present invention is to provide a method for categorizing data sets obtained from a number of sources, which simplifies the location of useful information in the data sets.

This object is according to a first variation of the present invention achieved through a method for categorizing data sets obtained from a number of sources, the data sets being composed of symbols, the method comprising:
determining the frequency of appearance of symbols in a first collection of data sets,
determining the frequency of appearance of symbols in a second collection of data sets,
determining the most significant symbols for the second collection based on the frequency of appearance in the first collection and the frequency of appearance in the second collection,
grouping the most significant symbols into groups according to their appearance in the same data set, and
ranking the data sets in relation to the symbol groups using a ranking scheme.

Another object of the present invention is to provide a device for categorizing data sets obtained from a number of sources, which enables the location of useful information in the data sets.

This object is according to a second variation of the present invention achieved through a device for categorizing data sets obtained from a number of sources, the data sets being composed of a number of symbols, the device comprising:
a symbol frequency determining unit configured to determine the frequency of appearance of symbols in a first collection of data sets and to determine the frequency of appearance of symbols in a second collection of data sets,
a significance determining unit configured to determine the most significant symbols for the second collection based on the frequency of appearance in the first collection and the frequency of appearance in the second collection,
a grouping unit configured to group the most significant symbols into groups according to their appearance in the same data set, and
a ranking unit configured to rank the data sets in relation to the symbol groups using a ranking scheme.

Another object of the present invention is to provide a computer program product for categorizing data sets obtained from a number of sources, which simplifies the location of useful information in the data sets.

This object is according to a third variation of the present invention achieved through a computer program product for categorizing data sets obtained from a number of sources, the data sets being composed of a number of symbols, the computer program product comprising a computer readable storage medium comprising computer program code causing a computer to:

determine the frequency of appearance of symbols in a first collection of data sets, determine the frequency of appearance of symbols in a second collection of data sets, determine the most significant symbols for the second collection based on the frequency of appearance in the first collection and the frequency of appearance in the second collection, group the most significant symbols into groups according to their appearance in the same data set, and rank the data sets in relation to the symbol groups using a ranking scheme.

The present invention has many advantages. It enables the location of useful information in data sets. More particularly it allows the obtaining of information about what data sets are relevant for various groups of symbols relating to the second collection of data sets, which may be a tool in for instance analysing trends among consumers or in society. In this way the invention enables analysis of various aspects of data sets through investigating the ranking of data sets in relation to various groups.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
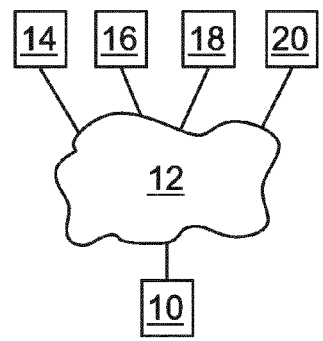
FIG. 1 schematically shows a device for categorizing data sets and being connected to a number of computers via a data communication network, FIG. 2 schematically shows a collection of data sets.

FIG. 1 schematically shows a device 10 for categorizing data sets according to the invention being connected to a number of computers 14, 16, 18 and 20 via a computer communication network 12. The computers 14, 16, 18 and 20 are here sources of information on which data sets are provided. The computer communication network 12 may here typically be the Internet, which means that the data sets provided by the various sources may be freely available sources. The sources may thus be public and accessible by any computer connected to the Internet. It should however be realized that the invention is not limited to the Internet but may be used in relation to any computer communication network. The device 10 is with advantage provided as one or more computers or servers having such access to the Internet.

Figure 2:
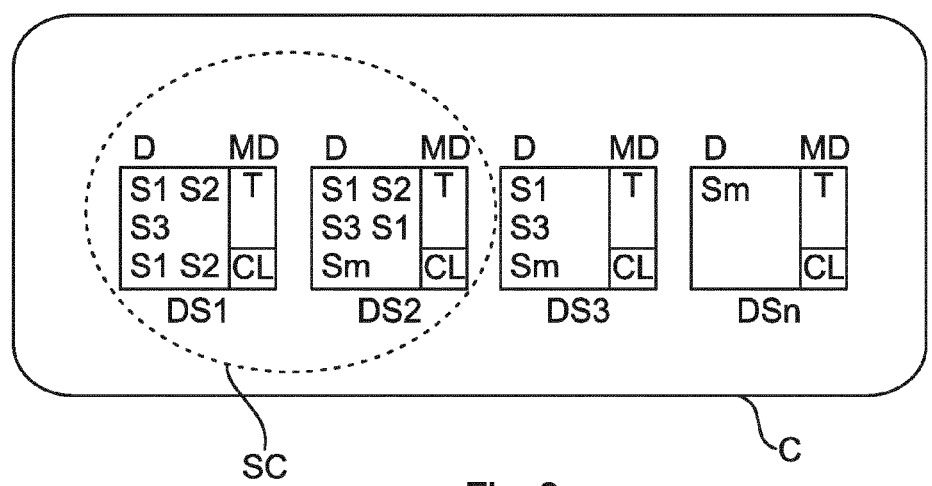

FIG. 2 schematically shows a number of data sets DS1, DS2, DS3, . . . DSn. The above-mentioned sources may each be provided with one or more data sets. In this example the data sets are data files or documents, comprising raw data D and meta data MD. The raw data D is made up of symbols such as words and can thus be for instance a text, and the meta data MD is data associated with the raw data D, such as a classification CL. A classification may be a categorization of the type of text or topic of the data set and may comprise indication of author, a short resume of the text etc. Such a metadata field may also comprise time information T indicating when the data set was created, last changed or made available or made public. The raw data field D of a data set may thus be made up of symbols. Here a first data set DS1 is shown as comprising two specimens of a first symbol S1 two specimens of a second symbol S2 and one specimen of a third symbol S3. A second data set DS2 is shown as comprising two specimens of the first symbol S1, one specimen of the second symbol S2, one specimen of a third symbol S3 and one specimen of an $m^{th}$ symbol. A third data set DS3 is shown as comprising one specimen of the first symbol, S1 one specimen of the third symbol S3 and one specimen of the $m^{th}$ symbol Sm. An $n^{th}$ data set DSn is finally shown as comprising one item of the $m^{th}$ symbol Sm.

A symbol is here typically a number of characters, such as alphanumeric characters, formed into an entity that is separated from other symbols via a special symbol separating character, such as a "space" character. The number of symbols has here been deliberately limited in order to provide a clearer understanding of the invention. Normally each data set comprise several more symbols, often several thousands of symbols. The shown data sets are here a collection C of data sets comprising all the shown data sets DS1, DS2, DS3 and DSn. The data sets are furthermore divided into parts, where one such part, or subcollection, SC is indicated as comprising the first and the second data sets DS1 and DS2. It should also be realized that a subcollection C or part of a whole collection C comprises several more data sets.

Figure 3:
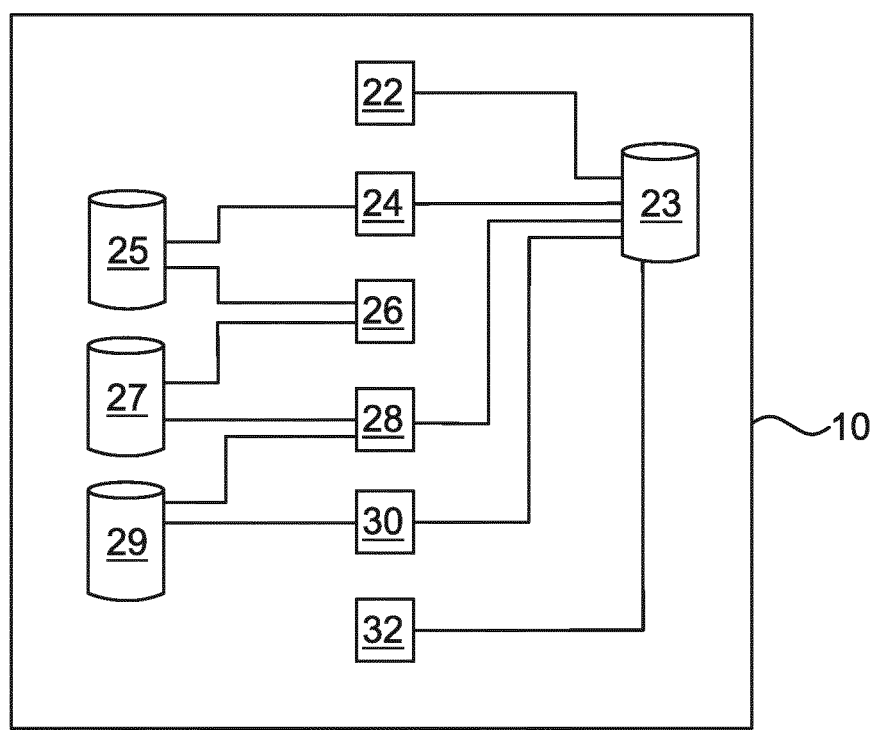
FIG. 3 shows a block schematic of the device for categorizing data, FIG. 4 schematically shows a flow chart of a method of characterizing data sets being performed by the device, and FIG. 5 schematically shows a computer program product in the form of a CD Rom disc comprising computer program code for categorizing data sets according to the invention.

FIG. 3 schematically shows a block schematic of the structure of the device 10. The device comprises a data set collecting unit 22, which is connected to a data set database 23. There is also a symbol frequency determining unit 24. The symbol frequency determining unit 24 is also connected to the data set database 23 as well as to a symbol frequency database 25. There is furthermore a significance determining unit 26. The significance determining unit 26 is connected to the symbol frequency database 25 and to a significance database 27. There is also a grouping unit 28, which is connected to the dataset database 23, to the significance database 27 and to a group database 29. There is also a ranking unit 30 connected to the data set database 23 and the group database 29. Finally there is a location identifier providing unit 32 connected to the data set database 23.

All the units are with advantage provided in the form of one or more processors with associated program memory comprising computer program code performing the functionality of these units. Here it should also be mentioned that as an alternative the data collecting unit 22 and the location identifier providing unit 32 may be omitted.

Figure 4:
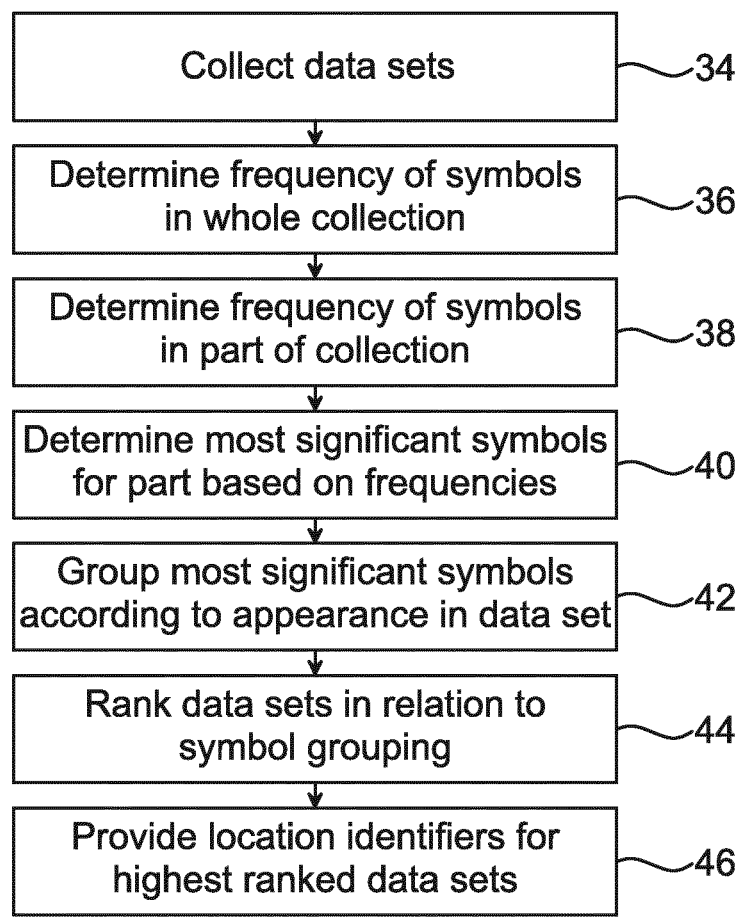

Now will follow a description of the invention as provided by the device 10 with reference being made to the previously described FIGS. 1-3 as well as to FIG. 4, which shows a flow chart of a method according to which the invention operates.

It is today possible to access a vast number of different data sets, such as electronic documents, blogs, articles, chat forums etc. on the Internet. The information provided through these data sets is diverse and may cover a wide range of subjects.

Since such information is easily accessible it may also be of interest to analyse it, for instance to investigate the trends in various areas, like technology trends and political trends.

However this cannot be done without in some way obtaining a categorizing of the data sets that enables such analysis.

The object of the present invention is to handle such a situation, namely to provide a way to structure and categorize a data sets that enables such analysis to be made. One embodiment of the invention is directed towards structuring and categorizing a collection of data sets for enabling an analysis to be made on a part of the collection, for instance a part of the collection directed towards one area of interest to analyse.

The operation of the invention for enabling this starts with the data collecting unit 22 collecting data sets from the various sources of information 14, 16, 18 and 20, step 34. The collected data sets here make up at least one collection C of data sets, which may then be stored in the data set database 23 for further analysis. In one variation of the invention a first and a second collection of data sets are collected.

As was mentioned above, the data sets comprise symbols such as words based on alphabetic or alphanumeric characters. The symbols may also comprise other types of characters such as signs, like a pound sign, exclamation mark etc. Such symbols may in some variations of the invention be formed through a combination of hexadecimal data characters separated from other symbols through a separation character such as a "space character".

In order to enable the categorisation of the data sets, the symbol frequency determining unit 24 accesses this data set database 23 and investigates all the data sets. In this first embodiment it investigates or determines the frequency of symbols in a whole collection C, here all data sets collected from the various sources, step 36. This means that the number of times that each symbol is present in the whole collection C is determined and registered. The investigation may furthermore be performed without the use of any previous categorisation of the data sets. The frequency is thus determined without data set classification or categorisation. Therefore a categorisation independent symbol frequency is obtained. The statistics may then be stored in the symbol frequency database 25. If the collection C in FIG. 2 is used as an example, this means that for the first symbol S1 there is a determination of how many times this symbol appears in all the data sets DS1-DSn.

However, this is not all that is done. The symbol frequency determining unit 24 also determines the frequency of appearance of symbols in a part SC of the collection C of data sets, step 38. This part is therefore a subcollection of the whole collection. The investigation may also here be performed without using any previous categorisation of the data sets of the subcollection. The frequency is thus determined without data set classification or categorisation. Therefore a categorisation independent symbol frequency is obtained. This means that the number of times symbols appear in the subcollection is determined. For the first symbol S1 this means that the number of times this symbol appears in the subcollection SC exemplified by the first and second data sets DS1 and DS2 is determined, which in the simplified example in FIG. 2 is three times.

The subcollection SC may be a subcollection dedicated to a certain information area, such as a certain area in which a lot of texts have been written of subjects such as technology, social sciences, sports, parenthood or health. The subcollection SC may also be a part of such a general field, like the politics of the US or Sweden etc. The subcollection may also be a subcollection according to type of data set, such as blog, chat or electronic document. As yet another possibility the subcollection SC may be based on time, for instance a specific point in time like a specific day or a time interval such as a week, a month or a year. A subcollection may be identified through a classification setting CL in the meta data MD of the data set, which meta data may here also comprise a time T setting out a time associated with the data set. It should also be realized that a subcollection SC may be based on a combination of such settings, such as a classification CL, like a classification such as politics, and time.

The frequency of symbols in the subcollection may then also be stored in a database such as symbol frequency database 25.

Once this has been done it is then possible for the significance determining unit 26 to determine the most significant symbols for the part based on both above-mentioned frequencies, i.e. based on the frequency of appearance in the whole collection and the frequency of appearance in the part, step 40. This may in one variation of the invention be done such the frequency of a symbol within the part of the collection C, a subcollection SC, is divided by the frequency of the same symbol in the whole collection. It is here possible that the most significant symbols are those for which the ratio between frequency in the part of the collection and the frequency in the whole collection is above a certain threshold, where the symbols having a ratio below this threshold are considered to be less significant. It is also possible to employ probabilities. The probability of a symbol in the subcollection is determined given the probability of the same symbol in the whole collection. In this way symbols that occur more often in the subcollection than what is probable given their occurrences in the whole collection, are deemed to be most significant.

This can also be expressed mathematically in the following way:

$$w_{jsc} \in Bin(n_{sc}, p_{0j})$$

$$p_{1,jsc}(k) = \frac{n_{sc}!}{k!(n_{sc}-k)!} p_{0j}^k (1-p_{0j})^{(n_{sc}-k)}$$

where $n_{sc}$ is the number of used symbols in the subcollection sc $w_{jsc}$ is the number of times symbol j has been used in the subcollection sc, $p_{0j}$ is the probability that a certain symbol taken from the whole collection is the symbol j, $(1-p_{0j})$ is the probability that the symbol in question is not symbol j, and $p_{1,jsc}(k)$ is the probability that symbol j appears k times in the subcollection sc under the presumption that the number of times symbol j occurs follows a binomial distribution with given parameters.

The probability of the symbol in the subcollection sc given the probability of the same symbol in the whole collection may then be determined as $p_{1,jsc}(w_{jsc})$.

The result may thereafter be stored in the significance database 27.

It is as an alternative possible that the above mentioned activities are performed on the first and the second collection, where the second collection can be a separate collection. The second collection may then be related to the first collection. If for instance the first collection is related to data sets provided in a first time interval, like a certain year, it is then possible that the second collection is made up of data sets provided in a second time interval having a relationship to the first time interval, such as data collected in a following year. The second collection may also be seen as, just as in the first embodiment, a subcollection or subpart of the first collection.

Thereafter the grouping unit 28 groups the most significant symbols into groups G according to their appearance in the same data set, step 42. This means that groups or clusters of symbols are being formed. These groups may be formed using a number of different types of techniques. It is for instance possible to use principal component analysis, clustering, such as Ward clustering, or multidimensional scaling. The groups may also be formed through a combination of two or more of these techniques. The groups may then be stored in a group database 29. As an example one such group is formed through the first symbol S1 and the second symbol S2.

When this has been done the ranking unit 30 ranks the data sets in relation to the symbol groups according to a ranking scheme, step 44. The ranking scheme may be based on the frequency of the symbols of the group in the data sets. In the ranking scheme used in the first embodiment a data set comprising more of the symbols of a group has a higher rank than a data set comprising fewer symbols of the same group. This means that as an example the first data set DS1 is ranked above the second data set DS2, since it comprises two specimens of the first symbol S1 and two specimens of the second symbol S2 and in totality four such specimens, while the second data set DS2 comprises two specimens of the first symbol S1 and one specimen of the second symbol S2. The absolute frequency of the symbols is thus higher in the first data set DS1 than in the second data set DS2. In a variation of this ranking scheme the frequencies are relative and related to the size of the data set. This variation of the ranking scheme thus employs the absolute frequency per symbol. These are just a few examples of ranking schemes that may be used. It should be known that it is possible with other types of ranking schemes.

The ranking may here be stored for the data sets in the database 23.

In this way it is possible for interested users to see what data sets in a part SC of a collection C of data sets are the most relevant for a certain subject area, such as a certain classification.

It is here also possible that the location identifier providing unit 32 provides location identifiers for the highest ranked data sets, step 46. This may be done for just one such group or for a number of groups of being associated with a subcollection or a part of the whole collection of data sets. A location identifier may for instance be Uniform resource locator (URL) or some other pointer to the computer on which the data set is provided. This data may be stored for the data sets in the data set database 23. A user desiring to access the highest ranked data set may therefore be provided with the location identifier of the data set.

As can be seen from the previous description, the invention provides unsupervised detection and categorization of word clusters in data sets comprising symbols, where the symbols may be provided as text data. Another way to categorize the expression unsupervised detection is through categorizing as open-ended detection. The invention thus provides unsupervised detection of salient concepts in text data and their contextual relationships.

Through the invention it is possible to obtain information about what data sets are relevant for various groups of symbols relating to a certain part of a collection of data sets, which may be a tool in for instance analysing trends in society. It is thus possible to analyse various aspects of a certain category through investigating the ranking of data sets in relation to various groups, which is a significant improvement in the location of relevant information concerning one or more such aspects.

Figure 5:
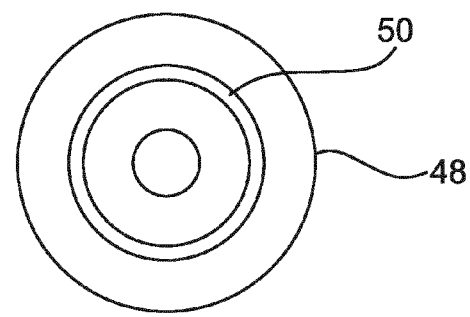

The device 10 may, as was mentioned above, be implemented using software in a computer. This software may furthermore be provided in the form of a computer program product, for instance as a data carrier carrying computer program code for implementing the units of the categorizing device 10 when being loaded into a computer and run by that computer. One such data carrier 48 with computer program code 50, in the form of a CD ROM disc is generally outlined in FIG. 5. A CD ROM disc is only one example of a data carrier. It is feasible with other data carriers, like memory sticks as well as hard disks.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method for categorizing data sets obtained from one or more computers via a computer communication network, said data sets comprising symbols, the method performed by one or more processors, the method comprising:
determining a frequency of appearance of symbols in a first collection of data sets;
determining a frequency of appearance of symbols in a second collection of data sets;
determining most significant symbols for the second collection based on the frequency of appearance in the first collection and on the frequency of appearance in the second collection, wherein said determining of the most significant symbols for the second collection is based on the probability $p_{1,jsc}(w_{jsc})$ of a symbol in the second collection given the probability of the same symbol in the first collection employing $$w_{jsc} \in Bin(n_{sc}, p_{0j}) \text{ and}$$

$$p_{1,jsc}(k) = \frac{n_{sc}!}{k!(n_{sc}-k)!} p_{0j}^k (1-p_{0j})^{(n_{sc}-k)},$$

where $n_{sc}$ is the number of used symbols in the second collection, $w_{jsc}$ is the number of times a symbol j has been used in the second collection, $p_{0j}$ is the probability that a certain symbol taken from the first collection is the symbol j, $(1-p_{0j})$ is the probability that the symbol in question is not symbol j, and $p_{1,jsc}(k)$ is the probability that symbol j appears k times in the second collection under the presumption that the number of times symbol j occurs follows a binomial distribution with given parameters;

grouping the most significant symbols into groups according to their appearance in the same data set; and ranking the data sets in relation to the symbol groups using a ranking scheme.

2. The method according to claim 1, further comprising collecting the data sets from said sources.

3. The method according to claim 1, further comprising providing location identifiers for the highest ranked data sets for at least one group.

4. The method according to claim 1, wherein the grouping of symbols is performed using principal component analysis.

5. The method according to claim 1, wherein the grouping of symbols is performed using clustering, such as Ward clustering.

6. The method according to claim 1, wherein the grouping of symbols is performed using multidimensional scaling.

7. The method according to claim 1, wherein the second collection is a part of the first collection.

8. The method according to claim 7, wherein the division of the collection of data into parts is based on time, such as a specific point in time or a time interval.

9. The method according to claim 7, wherein the division of the collection of data sets into parts is based on a classification of the data sets.

10. The method according to claim 9, wherein the data sets are documents and the classifications comprise subject, author and/or type of document.

11. The method according to claim 1, wherein the ranking scheme is based on the frequency of the symbols of the symbol group in the data sets.

12. The method according to claim 1, wherein at least the determining of the frequency of appearance of symbols in the first collection of data sets is categorisation independent.

13. A device for categorizing data sets obtained from one or more computers via a computer communication network, said data sets comprising symbols, the device comprising:
one or more processors; and
a memory configured for storing the data sets, the memory coupled to the one or more processors;
wherein the one or more processors comprise:
a symbol frequency determining unit configured to determine a frequency of appearance of symbols in a first collection of data sets and to determine a frequency of appearance of symbols in a second collection of data sets;
a significance determining unit configured to determine most significant symbols for the second collection based on the frequency of appearance in the first collection and the frequency of appearance in the second collection, wherein the determining of the most significant symbols for the second collection is based on the probability $p_{1,jsc}(w_{jsc})$ of a symbol in the second collection given the probability of the same symbol in the first collection employing $$w_{jsc} \in Bin(n_{sc}, p_{0j}) \text{ and}$$

$$p_{1,jsc}(k) = \frac{n_{sc}!}{k!(n_{sc}-k)!} p_{0j}^k (1-p_{0j})^{(n_{sc}-k)},$$

where $n_{sc}$ is the number of used symbols in the second collection, $w_{jsc}$ is the number of times symbol j has been used in the second collection, $p_{0j}$ is the probability that a certain symbol taken from the first collection is the symbol j, $(1-p_{0j})$ is the probability that the symbol in question is not symbol j, and $p_{1,jsc}(k)$ is the probability that symbol j appears k times in the second collection under the presumption that the number of times symbol j occurs follows a binomial distribution with given parameters;

a grouping unit configured to group the most significant symbols into groups according to their appearance in the same data set; and a ranking unit configured to rank the data sets in relation to the symbol groups using a ranking scheme.

14. The device according to claim 13, the one or more processors further comprising a data set collecting unit configured to collect the data sets from said sources.

15. The device according to claim 13, the one or more processors further comprising a location identifier providing unit configured to provide location identifiers for the highest ranked data sets of at least one group.

16. The device according to claim 13, wherein the symbol frequency determining unit, when determining the frequency of appearance of symbols, is configured to determine at least the frequency of appearance of symbols in the first collection of data sets independently of any data set categorisation.

17. A computer program product for categorizing a collection of data sets obtained from one or more computers via a computer communication network, said data sets stored in a database and comprising symbols, the computer program product comprising a non-transitory computer readable storage medium on which a computer program is stored, the computer program comprising computer program code, which, when being executed by a processor, causes the processor to perform operations comprising:

determining a frequency of appearance of symbols in a first collection of data sets;

determining a frequency of appearance of symbols in a second collection of data sets;

determining most significant symbols for the second collection based on the frequency of appearance in the first collection and the frequency of appearance in the second collection, wherein said determining of the most significant symbols for the second collection being based on the probability $p_{1,jsc}(w_{jsc})$ of a symbol in the second collection given the probability of the same symbol in the first collection employing $$w_{jsc} \in Bin(n_{sc}, p_{0j}) \text{ and}$$

$$p_{1,jsc}(k) = \frac{n_{sc}!}{k!(n_{sc}-k)!} p_{0j}^k (1-p_{0j})^{(n_{sc}-k)},$$

where $n_{sc}$ is the number of used symbols in the second collection, $w_{jsc}$ is the number of times symbol j has been used in the second collection, $p_{0j}$ is the probability that a certain symbol taken from the first collection is the symbol j, $(1-p_{0j})$ is the probability that the symbol in question is not symbol j, and $p_{1,jsc}(k)$ is the probability that symbol j appears k times in the second collection under the presumption that the number of times symbol j occurs follows a binomial distribution with given parameters, grouping the most significant symbols into groups according to their appearance in the same data set, and grouping the data sets in relation to the symbol groups using a ranking scheme.

* * * * *

UNITED STATES PATENT AND TRADEMARK OFFICE
CERTIFICATE OF CORRECTION

PATENT NO. : 9,563,666 B2  
APPLICATION NO. : 14/358438  
DATED : February 7, 2017  
INVENTOR(S) : Larsson et al.

Page 1 of 1

It is certified that error appears in the above-identified patent and that said Letters Patent is hereby corrected as shown below:

On the Title Page

(30) Foreign Application Priority Data:  
Please correct "(EP) .......... 11189099" to read -- (EP) ......... 11189099.2 --

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*